United States Patent
Nothacker

[15] 3,659,865

[45] May 2, 1972

[54] SAFETY SEAT FOR CHILDREN

[72] Inventor: Siegfried Nothacker, Wuppertal-Elberfeld, Germany

[73] Assignee: Gebr. Happich G.m.b.H., Wuppertal-Elberfeld, Germany

[22] Filed: Apr. 21, 1970

[21] Appl. No.: 30,489

[30] Foreign Application Priority Data

June 18, 1969 Germany...............P 19 30 891.9

[52] U.S. Cl...............280/7.1, 280/31, 297/118, 297/390, 297/457, 297/DIG. 2
[51] Int. Cl....................................................B62b 7/12
[58] Field of Search.......................280/7.1, 7.17, 30, 31; 297/DIG. 2, 457, 390, 250, 118; D15/1.3

[56] References Cited

UNITED STATES PATENTS

| | | | |
|---|---|---|---|
| 3,206,247 | 9/1965 | Johnson | 297/457 X |
| 3,550,998 | 12/1970 | Boudreau et al | 280/31 |
| 3,232,665 | 2/1966 | Von Wimmersperg | D15/1.3 UX |
| 3,054,637 | 9/1962 | Pambello | D15/1.3 UX |
| 2,990,190 | 6/1961 | Eriksen | 280/30 |
| 1,193,896 | 8/1916 | Hensel | 280/7.14 UX |
| 606,494 | 6/1898 | Weddell et al | 280/7.1 |
| 1,915,234 | 6/1933 | Magusin | 280/7.1 X |
| 3,409,325 | 11/1968 | Hamilton et al | D15/1.3 UX |

FOREIGN PATENTS OR APPLICATIONS

| | | | |
|---|---|---|---|
| 1,002,292 | 10/1951 | France | 280/7.1 |

Primary Examiner—Benjamin Hersh
Assistant Examiner—Milton L. Smith
Attorney—Ostrolenk, Faber, Gerb & Soffen

[57] ABSTRACT

A child's safety seat including a trough like shell with an upholstered interior and a safety padding spanning the width of the shell to be struck by the head of a child if he falls forward; fastening means on the base of the shell permit attachment to carrying straps and belts, transport wheels, sled runners and the like.

7 Claims, 12 Drawing Figures

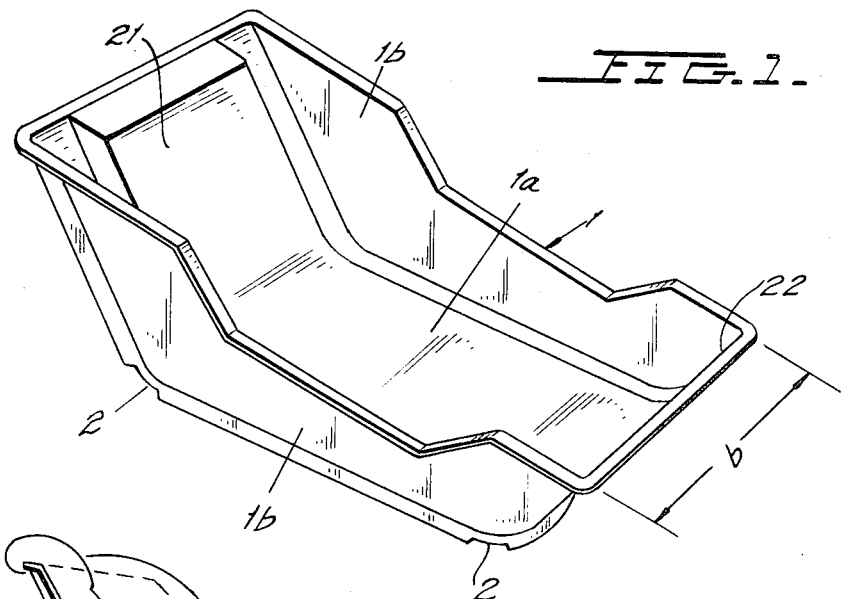
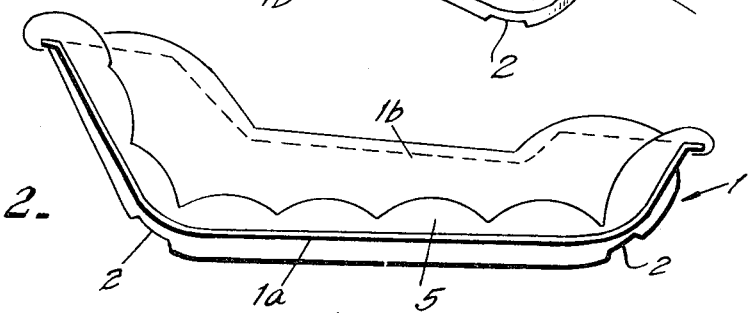
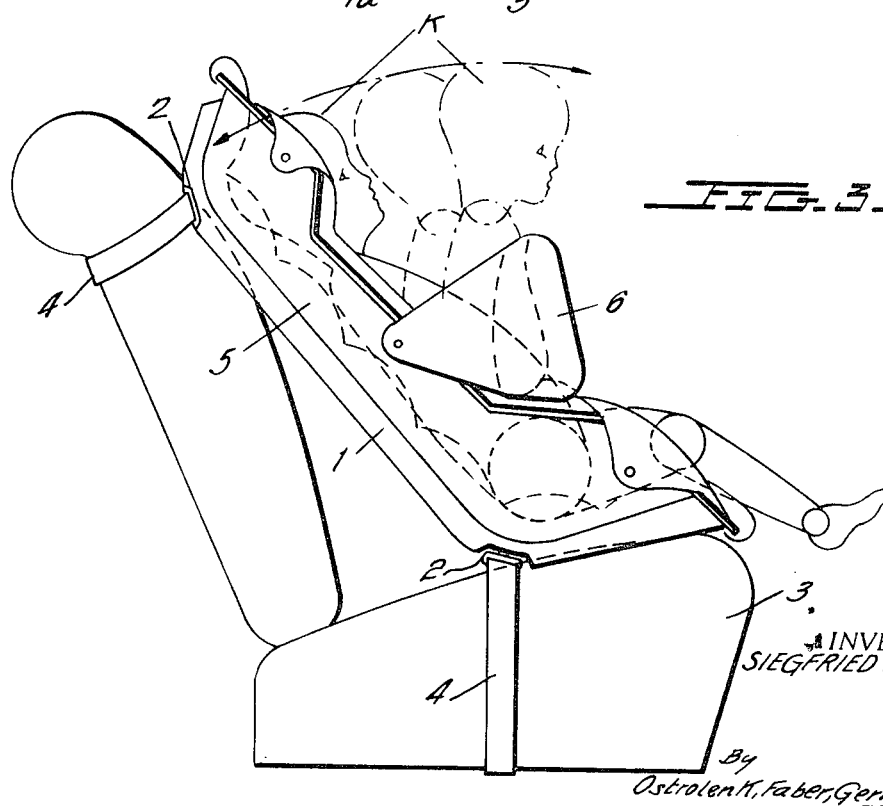

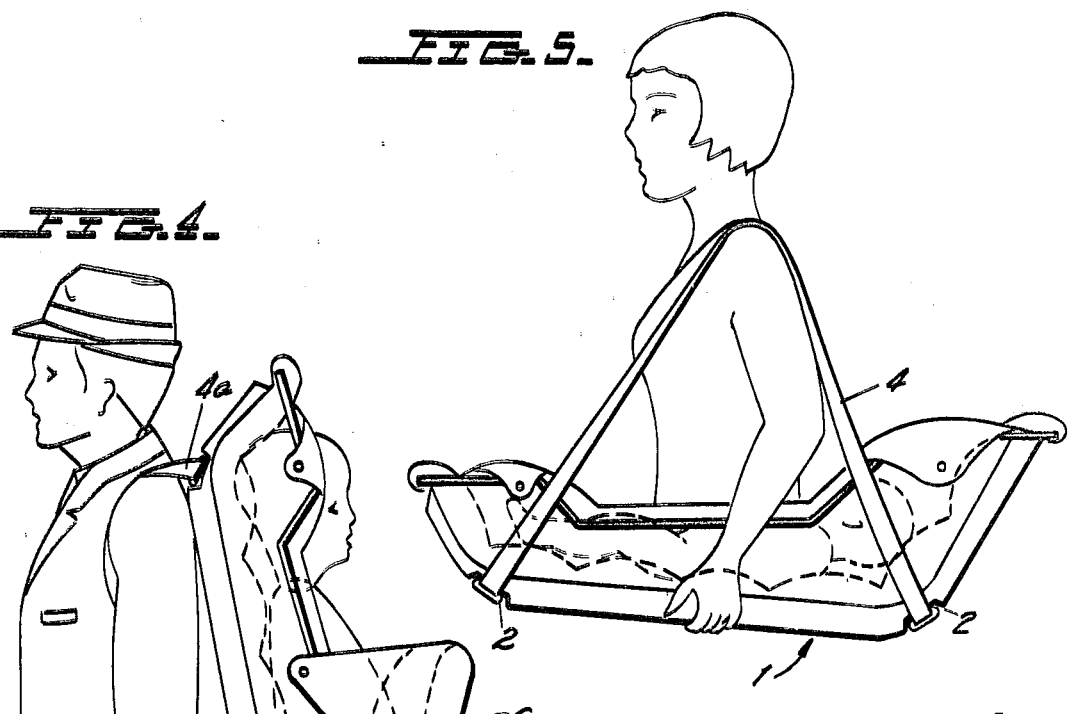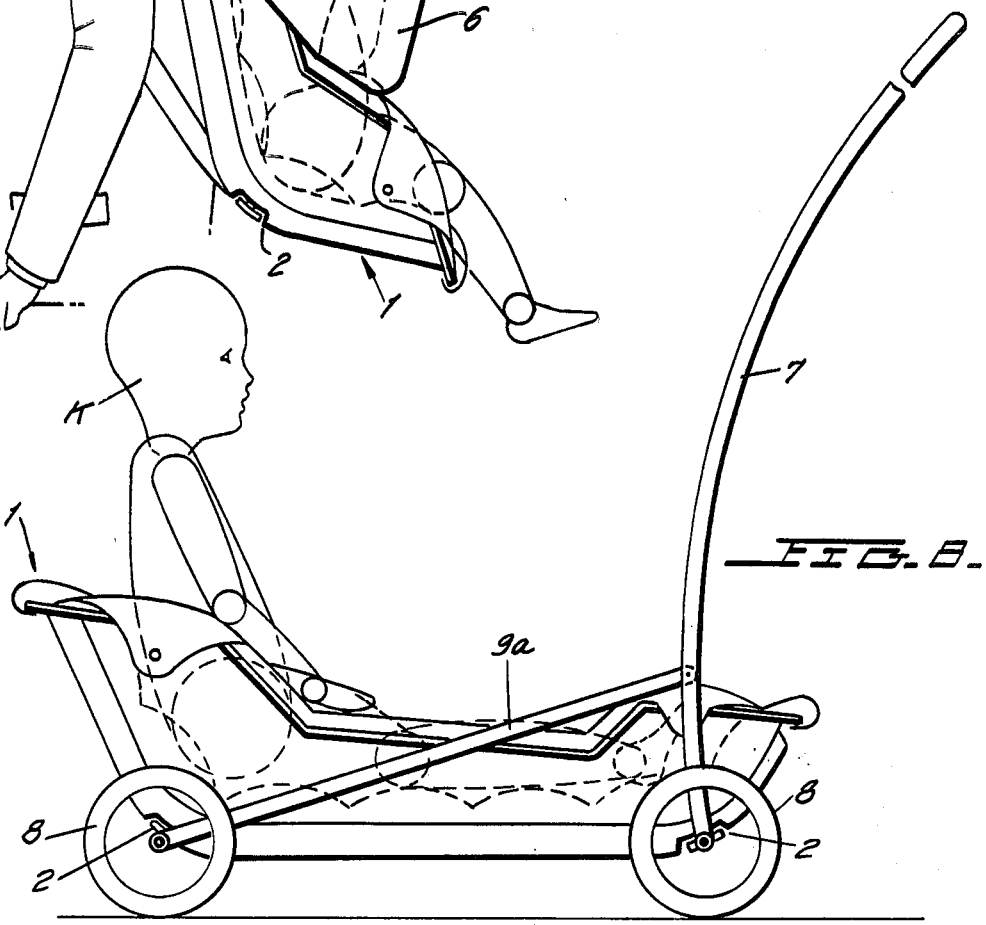

SAFETY SEAT FOR CHILDREN

This invention concerns a safety seat for children for use in automobiles and the like. Such seats are usually designed in the form of a child's chair. Frequently, they are provided with an undercarriage to enable the seats to be used as a cart.

However, presently available seats have a number of disadvantages. The child is held in a seated position with his entire weight resting on his buttocks. Support for the dorsal regions is minimal. Lateral support of the child's body, particularly with a sleeping child, is almost nonexistent. In addition, like an adult, the child must be maintained in these seats with safety belts in order not to be thrown out and injured in an accident or upon abrupt braking. To prevent a child's wriggling out of the belts, they are fitted tightly so that the child is deprived of freedom to move and is forced to maintain one position.

Moreover, every automobile seat for children is designed for a short interval in the growth of a child beginning, at the earliest, when the infant is able to sit independently. When the child has grown too large, the seat becomes useless.

The invention is directed toward an automobile safety seat for children which eliminates all these disadvantages. The seat comprises a unitary shell like trough, upholstered inside, and provided outside with attaching surfaces for attaching belts required for fastening the seat in the car and/or the additional devices for converting the seat to other uses. Shock absorbing padding extends over the open end of the shell to prevent the child's being injured by falling forward.

This seat is shaped to the form of the body of a child between infant and preschool ages. Yet, it leaves a child sufficient liberty of movement so that the child can be transported in the seat without fatigue even for prolonged periods.

The shell of the seat is provided with carrying belts at its attaching surfaces so that the seat can be carried like a knapsack or be suspended from a shoulder belt. Alternatively, at least one or a pair of wheels and a guide rod therefor may be fastened to the attaching surfaces of the shell to convert the seat into a child's cart.

Moreover, longitudinal runners may be secured at the attaching surfaces so that the seat can be used as a sled. In addition to the main runners, at the front part of the shell an articulated pair of runners may be provided so that the sled can be guided. These runners are of particular use when the child has grown so that use of the automobile safety seat for transporting the child becomes superfluous.

Furthermore, at its attaching surfaces, the shell may have two pairs of wheels, one of which can be driven and the other guided and/or driven so that the seat can be used as a child's self-propelled vehicle.

It is the primary object of the invention to provide a novel seat for a child.

It is another object to provide a safe seat.

It is a further object to provide a seat that permits a child freedom of movement.

It is yet another object of the invention to provide a seat which may be used in an automobile.

It is a further object of the invention to provide such a seat which may be used in a number of other ways.

The following description and the accompanying drawings will provide a fuller understanding of the subject of the invention:

FIG. 1 is a perspective view of the shell of a safety seat for children in accordance with the invention, without upholstery;

FIG. 2 is a longitudinal cross section view through the shell in FIG. 1, with upholstery added;

FIG. 3 is a lateral view of the seat of the invention as fastened to the seat of an automobile;

FIG. 4 shows the seat of the invention being carried like a knapsack;

FIG. 5 shows the seat being carried from a shoulder belt;

FIG. 8 shows the seat converted into a child's carriage;

Figure 6:
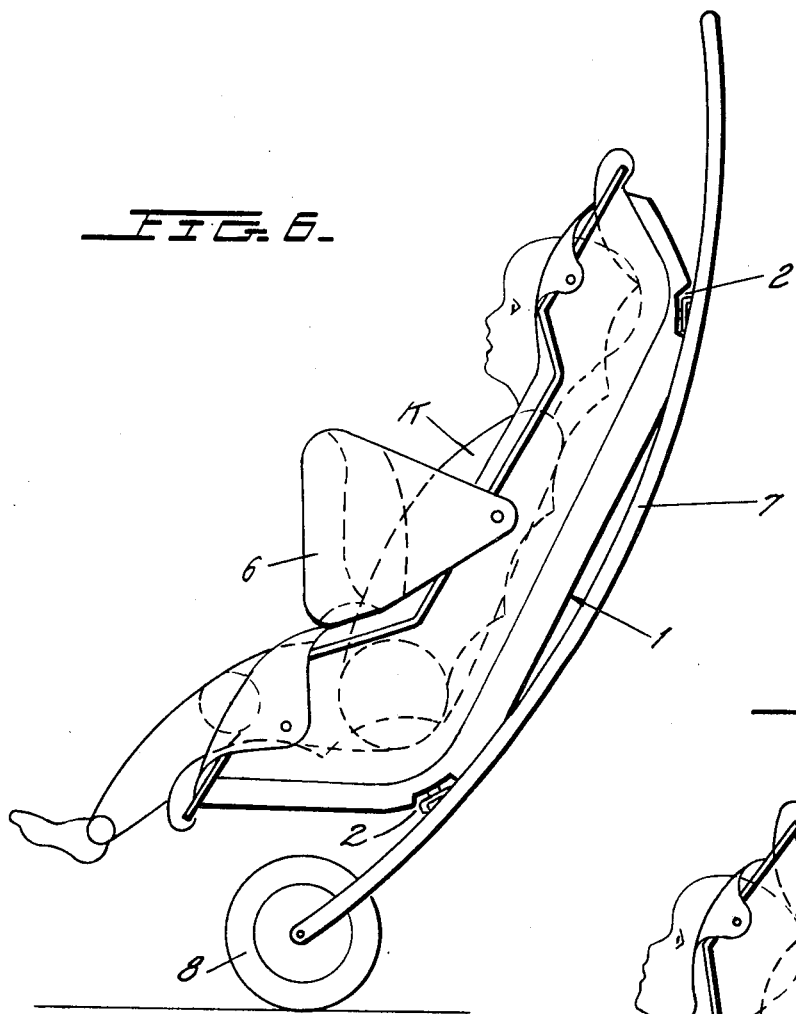
FIG. 6 shows the seat equipped with a pair of wheels so that it might serve as a child's cart.

Trough like shell 1 shown in FIG. 1 is manufactured, preferably as a single unit, from a plastics material. The shell is open topped and encloses a cavity defined by shell bottom 1a, head support wall 21, leg support wall 22 and side walls 16 all joined together to form one unit. Shell 1 is provided on its outside near its bottom with attaching surfaces 2 for receiving belts 4 for fastening the shell to the automobile seat 3 (as shown in FIG. 3) or receiving belts 4a (FIG. 4a) or 4b (FIG. 5), required for carrying shell 1, or receiving other devices as described further below. The inside of shell 1 has upholstery 5, covering the shell bottom 1a, the side walls 1b and head and leg rests 21, 22 (FIG. 2).

FIG. 3 shows a shock absorbing padding 6 extending across the entire width of shell 1 and secured to side walls 1b of shell 1 near the edges.

As shown schematically in FIG. 3 the head of child K will be supported, in abrupt braking or in a collision, by shock absorbent padding 6 where the child's spine is simultaneously slightly extended but where his body does not lose its support in the seat.

Simply by changing the lengths of belts 4, the safety seat can be carried like a knapsack (FIG. 4) or from a shoulder belt (FIG. 5).

Figure 7:
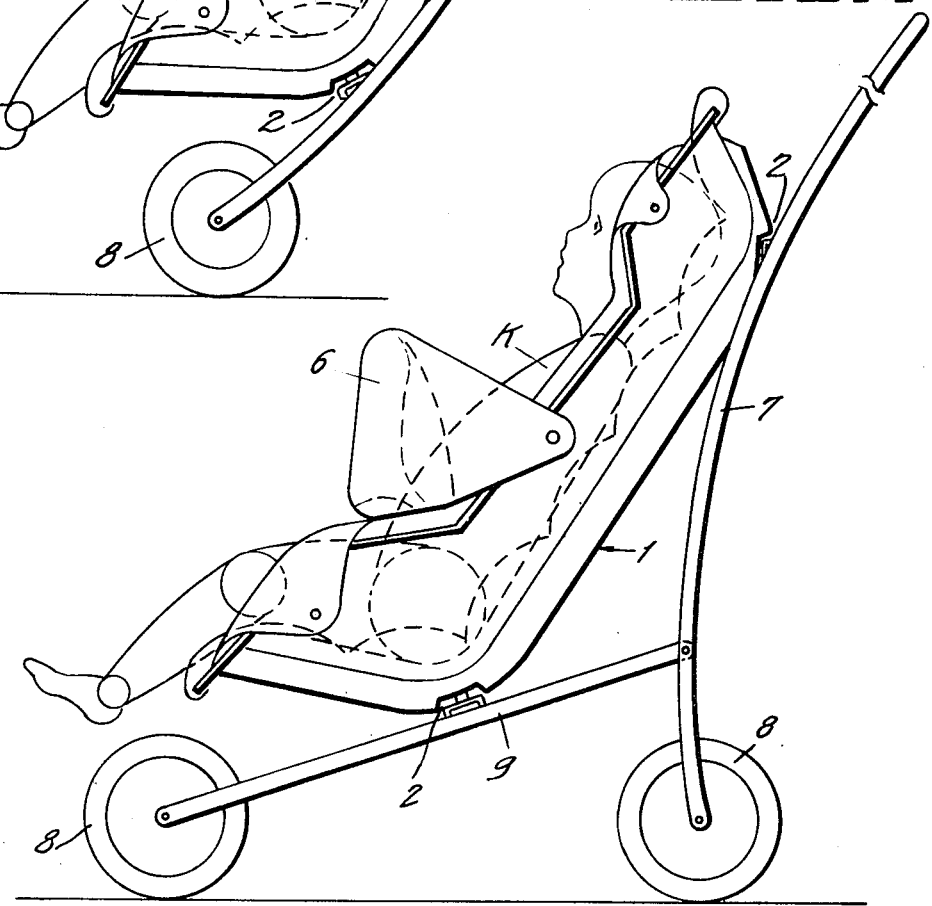
FIG. 7 shows the seat provided with two pairs of wheels as a child's carriage.

FIGS. 6-8 show different ways in which shell 1 can be transformed into a child's cart or a child's carriage. To make the production of the additional parts required for converting the automobile safety seat to other forms of use as rational and inexpensive as possible, these parts are based on the modular unit principle so that a number of parts having the same shapes and dimensions can be utilized universally. In FIGS. 6-8, guide rod 7 and pairs of wheels 8 are such parts.

Figure 12:
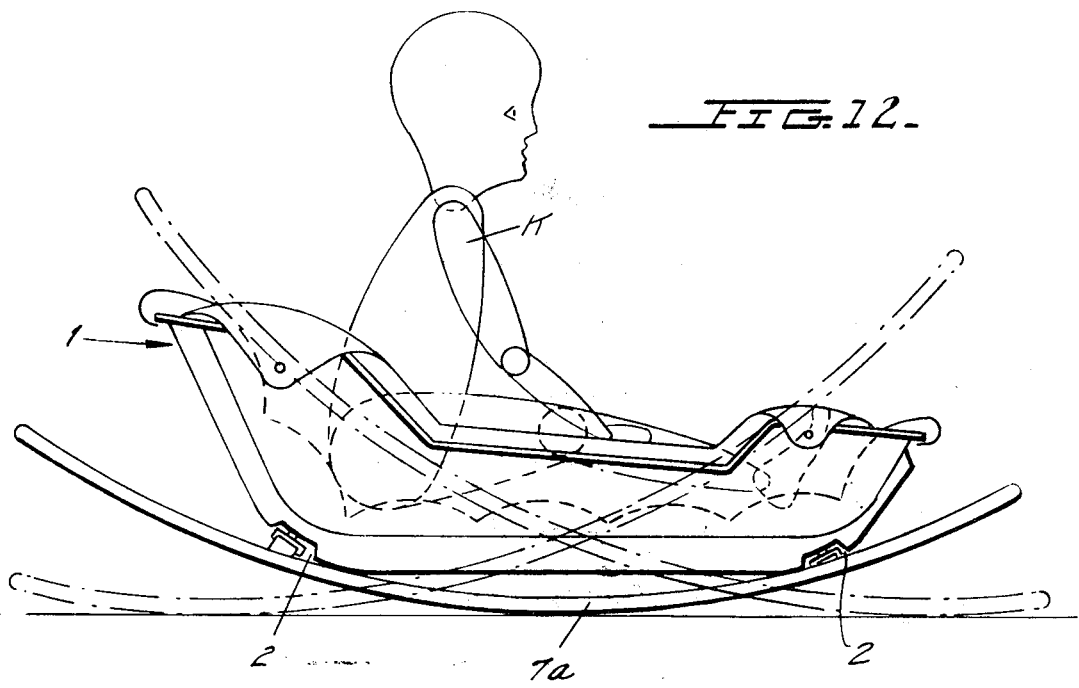
FIG. 12 shows the seat equipped with rockers.

By providing an intermediate strut 9 or 9a, the single- or double-wheel cart in FIG. 6 can be converted into a single- or double-axle design as in FIGS. 7 or 8. After removal of wheel or pair of wheels 8, guide rod 7 can remain as rocker 7a on shell 1 (FIG. 12) so that the seat is converted into a rocking chair.

Figure 9:
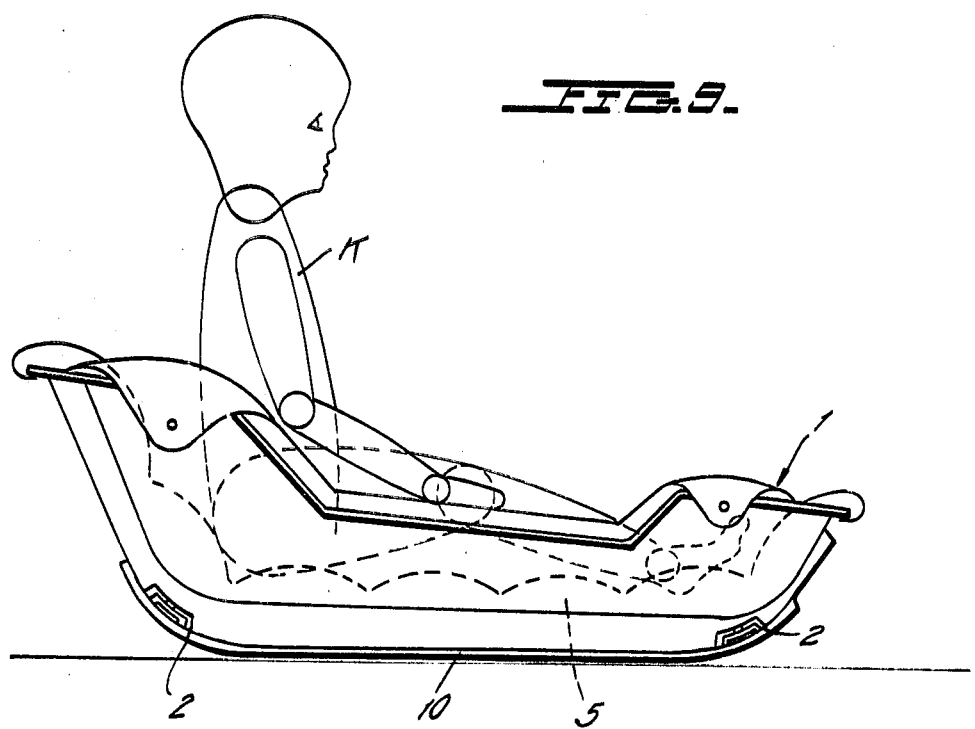
FIG. 9 shows the seat converted into a sled.
Figure 10:
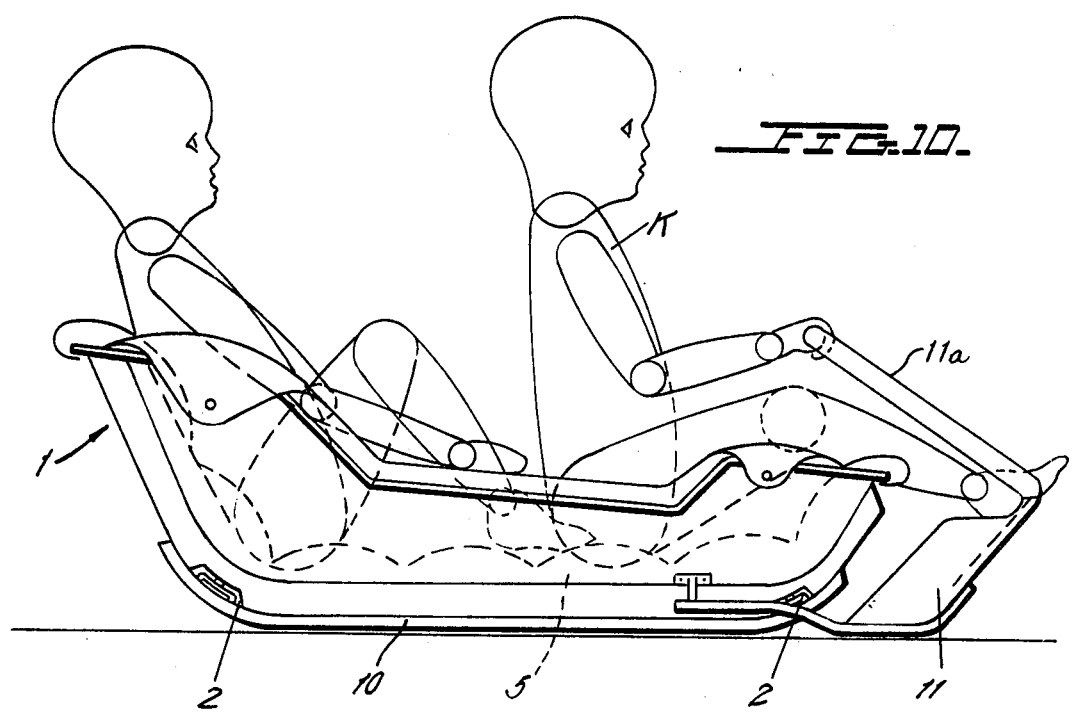
FIG. 10 shows the seat of FIG. 9 provided with articulated runners.

By providing longitudinal runners 10 on shell 1, the seat is converted to a sled (FIG. 9). In addition to the runners 10, as shown in FIG. 10, at the front part of shell 1, an additional articulated pair of runners 11 can be attached to shell 1 at the front of runners 10 so that the sled can be self-guided. The additional runners 11 can be shifted by means of handles 11a held by child K.

Figure 11:
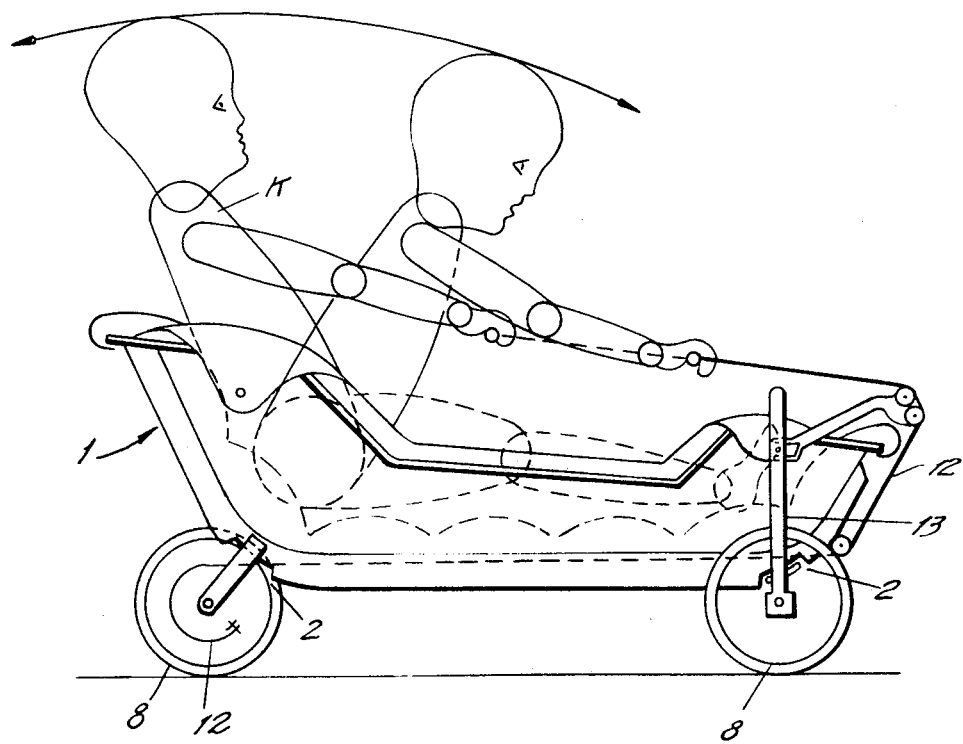
FIG. 11 shows the seat converted into a child's self-propelled vehicle.

In FIG. 11, the front pair of wheels 8 is here appropriately supported by a foot operated steering mechanism 13 for guiding the self-propelled vehicle. The rear pair of wheels 8 can be driven in known manner by drawband 12. Instead of drawband 12, the rear pair of wheels 8 may be driven across a crank shaft and a reciprocating manually operable lever.

Although there has been described a preferred embodiment of this novel invention, many variations and modifications will now be apparent to those skilled in the art. Therefore, this invention is to be limited, not by the specific disclosure herein, but only by the appended claims.

The embodiments of the invention in which an exclusive privilege or property is claimed are defined as follows:

1. A safety seat for children comprising a trough like cavity defined by a shell comprising a bottom, an upwardly inclined head rest wall, an elevated leg support wall, and upwardly extending side walls secured to said head rest and leg support walls enclosing said shell; padded upholstery within said shell over said head rest wall, said bottom and said leg support wall; attaching means on the exterior of said shell on the bottom thereof for attaching belts and additional devices for converting said seat to various uses; said side walls having upper edges; secured to said side walls and passing over said edges is a shock absorbing padding element which extends across the width of said shell; said padding element being sufficiently near said head rest wall that the head of a child in said shell will strike said padding after moving forward a short distance.

2. The seat of claim 1, where said shell is provided at said attaching means with carrying belts in such a manner that said seat can be carried by said belts.

3. The seat of claim 1 with a rigid guide rod fastened to said attaching means of said shell; at least one wheel secured to said guide rod in such manner that the seat may be wheeled about.

4. The seat of claim 1, where said shell is removably provided at said attaching means with longitudinal runners whereby said seat can be used as a sled.

5. The seat of claim 4 including additional articulated runners; said shell having front and rear parts with said longitudinal runners extending between them; said articulated runners being secured at said front part of said shell and including handles secured to said articulated runners for permitting shifting thereof so that the sled can be guided.

6. The seat of claim 1 where said shell is provided at said attaching means with two spaced apart pairs of wheels; drive means connected with at least one of said wheel pairs for driving the respective said wheel pair and said shell and guide means connected with at least one of said wheel pairs for steering the said wheel pair and said shell, whereby said shell is guided by said guide means.

7. The seat of claim 1 where said shell has secured at said attaching means rockers that are curved in relation to said shell in such manner that said seat can be used as a rocker.

* * * * *